United States Patent
Louthan et al.

(10) Patent No.: US 6,994,000 B2
(45) Date of Patent: Feb. 7, 2006

(54) FIXTURE AND LOCATOR DEVICE FOR SUPPORTING A ROTATABLE MEMBER

(75) Inventors: Gary R. Louthan, Westminster, CA (US); Loc Tran, Gardena, CA (US)

(73) Assignee: Honeywell International, Inc., Morristown, NJ (US)

( * ) Notice: Subject to any disclaimer, the term of this patent is extended or adjusted under 35 U.S.C. 154(b) by 286 days.

(21) Appl. No.: 10/628,910

(22) Filed: Jul. 28, 2003

(65) Prior Publication Data

US 2005/0023778 A1 Feb. 3, 2005

(51) Int. Cl.
*B23B 31/10* (2006.01)

(52) U.S. Cl. .................... 82/1.11; 279/133; 279/137; 279/156; 29/557; 29/889

(58) Field of Classification Search .............. 279/51, 279/127, 133, 136, 137, 156; 82/1.11, 152, 82/162; 29/557, 889, 888.02, 888.025
See application file for complete search history.

(56) References Cited

U.S. PATENT DOCUMENTS

| | | | | |
|---|---|---|---|---|
| 1,056,954 A | * | 3/1913 | Sponable | ................ 279/136 |
| 1,577,299 A | | 3/1926 | Rohde | |
| 1,882,871 A | | 10/1932 | Page | |
| 1,882,997 A | | 10/1932 | Scott | |
| 2,480,807 A | | 8/1949 | De Vlieg | |
| 3,576,070 A | | 4/1971 | Parsons | |
| 3,750,498 A | * | 8/1973 | Willen | ................ 82/158 |
| 3,773,312 A | | 11/1973 | Victorino | |
| 4,009,874 A | | 3/1977 | Hughley | |
| 4,141,181 A | | 2/1979 | Munnich | |
| 4,720,243 A | | 1/1988 | Katayama et al. | |
| 5,531,633 A | | 7/1996 | Riley et al. | |
| 5,822,841 A | | 10/1998 | Bales et al. | |
| 6,415,508 B1 | * | 7/2002 | Laps | ............ 29/894.362 |
| 6,520,508 B1 | * | 2/2003 | Jordan | .............. 279/46.7 |
| 6,702,398 B2 | * | 3/2004 | Laps | .............. 301/105.1 |
| 2002/0066185 A1 | * | 6/2002 | Loustanau et al. | ....... 29/898.06 |
| 2004/0022648 A1 | * | 2/2004 | Cabrales et al. | .......... 417/407 |

FOREIGN PATENT DOCUMENTS

| | | | |
|---|---|---|---|
| CH | 670780 A | * | 7/1989 |
| GB | 586100 | | 3/1947 |

* cited by examiner

*Primary Examiner*—Derris H. Banks
*Assistant Examiner*—Michael W. Talbot
(74) *Attorney, Agent, or Firm*—Chris James

(57) ABSTRACT

There is provided a locator device and an associated fixture and method for supporting a rotatable member. The locator device has a base and a plurality of flanges extending from the base in an axial direction and arranged circumferentially to define an aperture for at least partially receiving the rotatable member axially. The flanges defining slots for receiving radial portions of the rotatable member with the radial portions extending radially outward from the flanges. Thus, the locator device can support boreless rotatable members so that a tool can be supported against the radial portions of the rotatable member to thereby form the rotatable member to predetermined dimensions.

16 Claims, 3 Drawing Sheets

FIXTURE AND LOCATOR DEVICE FOR SUPPORTING A ROTATABLE MEMBER

FIELD OF THE INVENTION

The present invention relates generally to a fixture and method for supporting a rotatable member such as a wheel or spindle during manufacture and, more particularly, a fixture that can support a boreless rotatable member such as a boreless compressor wheel.

BACKGROUND OF THE INVENTION

Boreless compressor wheels are characterized by a hub that extends in an axial direction with first and second opposite faces and a plurality of blades that extend radially on the first face. In operation, the wheel is configured to rotate about its axis so that the blades move, or are moved by, air passing proximate to the first face of the wheel. For example, the wheel can be mounted in a housing with a connection portion on the second face of the wheel engaged to a shaft so that as the shaft and the wheel are rotated, the blades push air through the housing. As the name suggests, a boreless compressor wheel does not have a bore that extends through the hub for mounting. Instead, the connection portion on the second face can extend from the face or can define an aperture that does not extend to the first face of the wheel.

During the manufacture of a boreless compressor wheel, the wheel must be sufficiently supported so that the faces and/or blades can be machined or otherwise formed to desired tolerances. Therefore, the compressor wheel is supported to resist the forces on the wheel associated with the machining or other forming operations.

For example, during a conventional manufacturing process, the boreless compressor wheel is supported in a chuck and turned, i.e., machined, in a lathe.

The chuck receives at least part of the blades and the first face of the wheel so that the wheel can be sufficiently supported while the lathe is used to partially form or finish the exposed faces and/or blades. The wheel is then removed from the chuck and secured in a second chuck that supports the wheel by other portions to expose the portions that were previously inaccessible for machining. Thus, those portions of the first face and blades that are obstructed by the first chuck can be formed while the wheel is secured in the second chuck. However, the use of successive machining operations increases the time required for forming or finishing the wheel. Further, the cost of the two chucks required for securing the wheel increases the cost of the wheels.

Thus, there exists a need for an improved fixture for supporting a boreless compressor wheel or other rotatable member. Preferably, the fixture should be capable of securing the member so that the member can be machined or otherwise formed to predetermined dimensions within predetermined tolerances. Further, the fixture should secure the member without obstructing access to portions of the member that are to be machined, for example, the blades of a boreless compressor wheel, so that the member can be machined without removing the member from the fixture.

BRIEF DESCRIPTION OF THE SEVERAL VIEWS OF THE DRAWINGS

Figure 1:
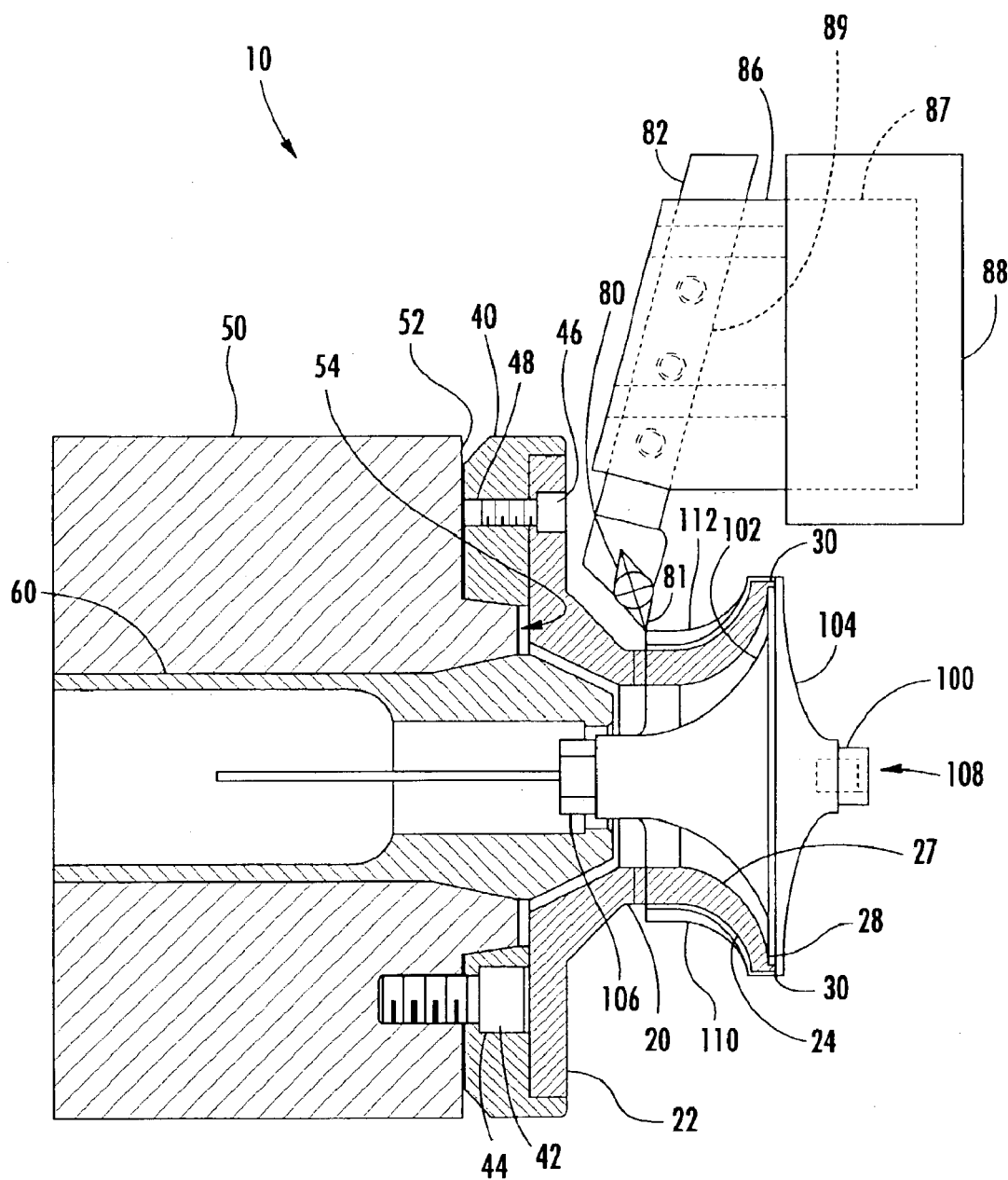
Figure 3:
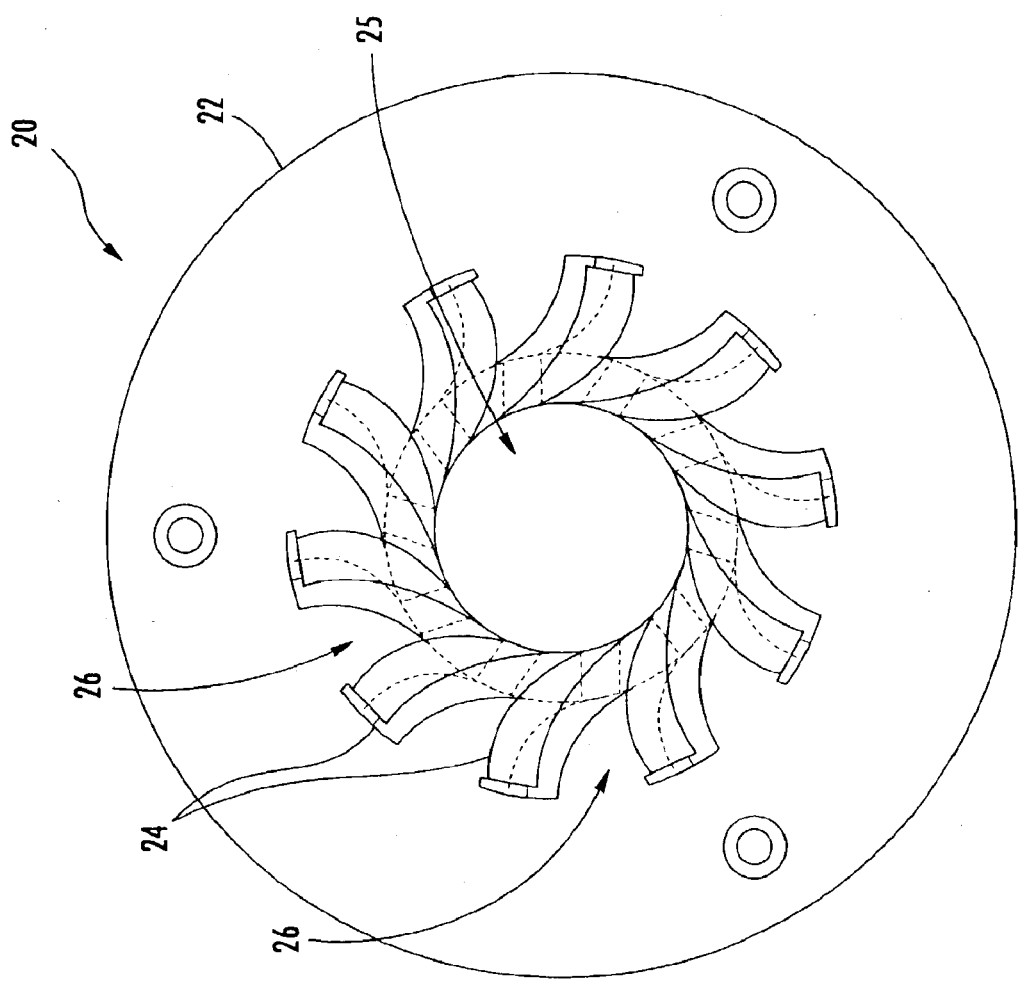
Figure 2:
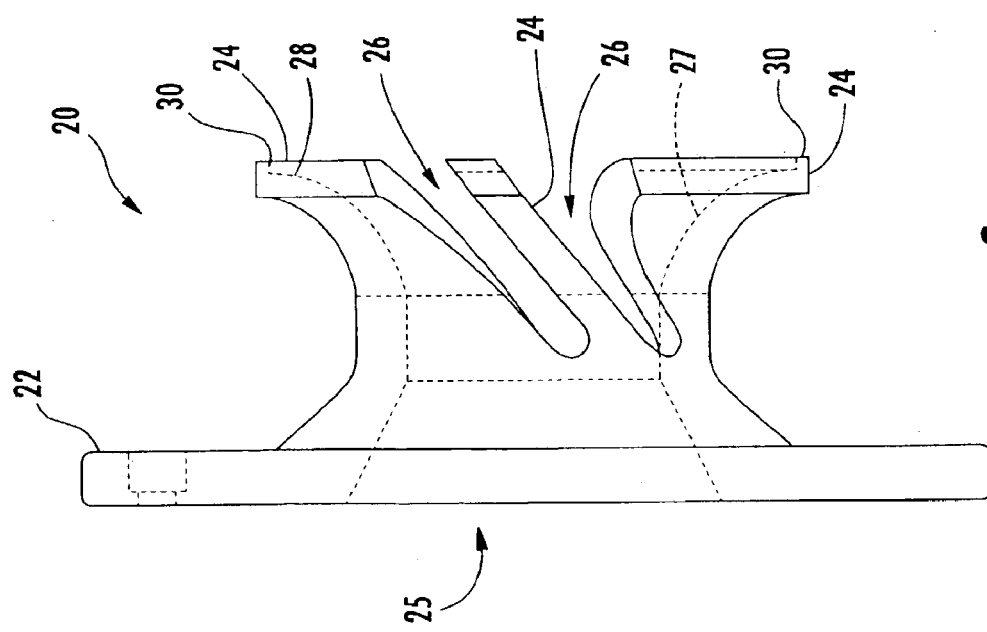
Figure 4A:
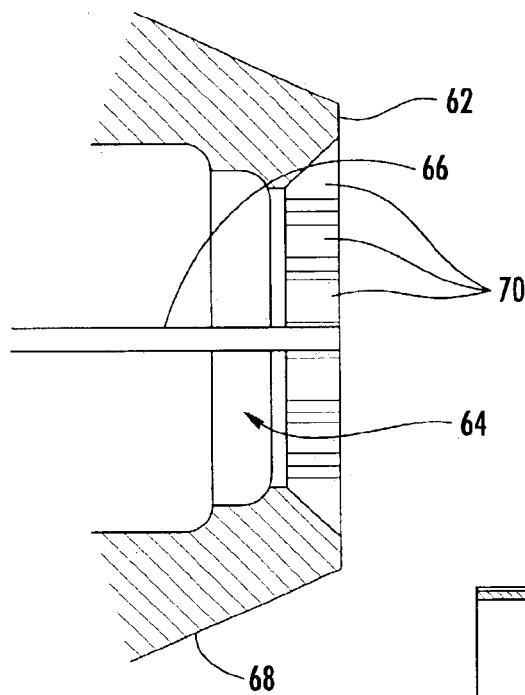
Figure 4:
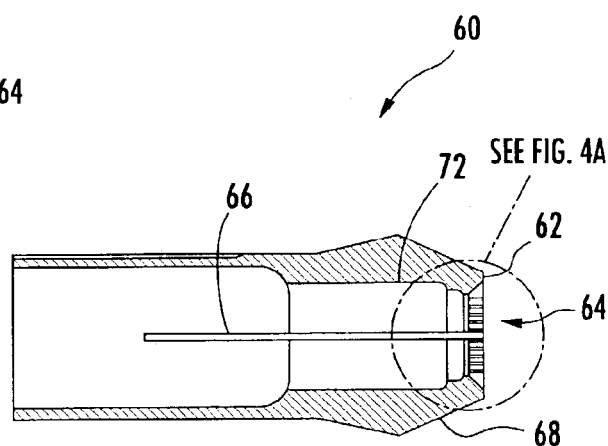
Figure 5:
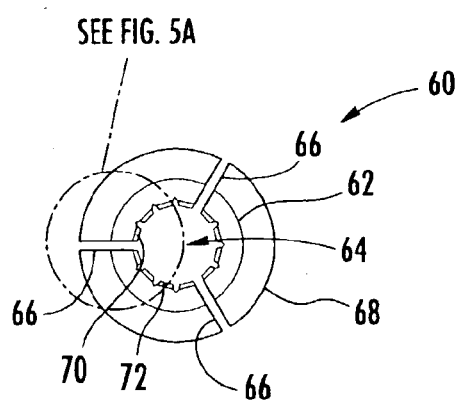

Having thus described the invention in general terms, reference will now be made to the accompanying drawings, which are not necessarily drawn to scale, and wherein:

FIG. 1 is section view illustrating a fixture for supporting a rotatable member during manufacture according to one embodiment of the present invention;

FIG. 2 is an elevation view illustrating the locator device of the fixture of FIG. 1;

FIG. 3 is a side view illustrating the right side of the locator device of FIG. 2;

FIG. 4 is an elevation view illustrating the collet of the fixture of FIG. 1;

FIG. 4A is an enlarged view illustrating a portion of the collet as indicated in FIG. 4;

FIG. 5 is a side view illustrating the right side of the collet of FIG. 4; and

Figure 5A:
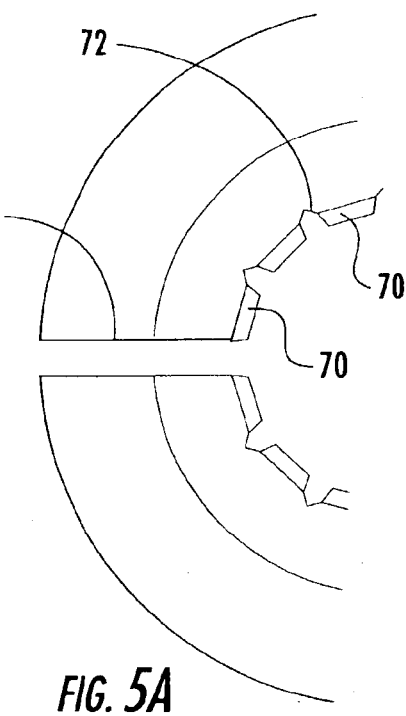

FIG. 5A is an enlarged view illustrating a portion of the collet as indicated in FIG. 5.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown a fixture 10 for supporting a rotatable member 100 with a plurality of radial portions 110. The rotatable member 100 can be a wheel, spindle, or other rotatable member that is supported by the fixture 10 during manufacture and subsequently installed in a rotary device such as a compressor, turbocharger, pump, blower, and the like. In addition, the rotatable member 100 can be a boreless device, i.e., one without a bore extending therethrough for receiving a shaft or other mounting device for securing the member.

The rotatable member 100 illustrated in FIG. 1 is a boreless compressor wheel. The member 100 has first and second curved faces 102, 104 directed generally in opposite axial directions of the member 100. The radial portions 110 of the member 100 are blades that extend axially and radially from the first face 102 of the member 100. Part of the first face 102 is a surface of revolution and, in operation, defines the inner diameter of a generally annular flowpath through a compressor in which the wheel 100 is mounted. First and second connection portions are defined on the faces 102, 104 for mounting the member 100 during operation. For example, the first face 102 can define a hexagonal head 106 and the second face 104 can define a threaded aperture 108 so that the member 100 can be installed in a compressor with the head 106 engaged by a corresponding socket and the aperture 108 engaging a threaded shaft. The member 100 can be rotated in the compressor so that the blades compress air passing through a housing of the compressor. Thus, for example, the compressor can be used to compress air in operation of a turbocharger.

The fixture 10 is used to support the member 100 during manufacture, for example, while the member 100 is formed to predetermined dimensions by machining. For instance, the member 100 may be cast to a near net shape, and may then be machined to the final desired dimensions. A locator device 20, shown individually in FIGS. 2 and 3, corresponds to the rotatable member 100 so that the member 100 can be supported during machining without the use of a rod or shaft, extending through the member 100. In particular, the locator device 20 has a base 22 and a plurality of flanges 24. The flanges 24 extend from the base 22 in the axial direction and are arranged circumferentially to define an aperture 25. The aperture 25 is large enough to at least partially receive the member 100 in the axial direction. Further, the flanges 24 define slots 26 therebetween for receiving the radial portions 110 of the member 100. As shown in FIG. 1, the first face 102 of the member 100 is received by the locator device 20 with the radial portions 110 extending radially through the slots 26. Thus, the curved edge, or profile 112, of the radial portions 110 can be formed to a desired contour, for example, by machining, while the member 100 is supported in the locator device 20.

The configuration of the flanges 24 and, hence, the slots 26, can correspond to the configuration of the radial portions 110 of the rotatable member 100. For example, the flanges 24 can extend helically in the axial direction to receive correspondingly helical radial portions 110. The flanges 24 can also flare radially outward to define a curved inner portion 27. The curved inner portion 27 can define a curvature that is similar or different than the curvature of the first face 102 of the member 100. According to one embodiment of the present invention, the flanges 24 flare about 90 degrees so that the curved inner portion 27 defines a surface 28 perpendicular to the axial direction and directed toward the first face of the member 100. Thus, the surface 28 supports the member 100 axially. Further, each flange 24 can define a lip 30 that extends in the axial direction from the surface 28. The lips 30 can collectively correspond to an outer circumference of the rotatable member 100 so that the lips 30 align and retain the member 100 radially in the fixture 10, as best seen in FIG. 1.

The base 22 of the locator device is connected by an adapter plate 40 to a spindle 50, such as a spindle of a lathe, which is configured to rotate about an axis collinear with the axis of the rotatable member 100 so that the member 100 can be turned, or machined, to predetermined dimensions. The adapter plate 40 defines connection features for connecting to each of the spindle 50 and the locator device 20. For example, bolts 42 can extend through bores 44 in the adapter plate 40 and into a front face 52 of the spindle 50 that is directed toward the rotatable member 100, and additional bolts 46 can extend through the locator device 20 and into tapped apertures 48 of the adapter plate 40.

The spindle 50 and the adapter plate 40 define a bore 54 through which a collet 60 extends. The collet 60, which is illustrated individually in FIGS. 4, 4A, 5 and 5A, extends in the axial direction of the member and is configured to rotate with the spindle 50. An end 62 of the collet 60 defines an aperture 64 for receiving the head 106 of the member 100. In addition, radial slots 66 extend from the aperture 64 to an outer surface 68 of the collet 60 and axially from the end 62 of the collet 60 along a portion of the collet 60. Axially extending ridges 70 are also provided on an inner surface 72 of the collet 60 for supporting the member 100. Thus, the head 106 of the member 100 can be urged into the aperture 64, slid along the ridges 70, and supported therein.

The adapter plate 40 and/or the locator device 20 can be removed from the spindle 50 and replaced with substitute components that correspond to a particular rotatable member 100. Thus, the spindle 50 and/or the collet 60 can be used with adapter plates and locator devices of different configurations for processing rotatable members 100 having different configurations in the fixture 10.

Preferably, the fixture 10 secures the member 100 so that the member 100 can be formed using a tool 80 that exerts a force on the rotatable member 100, e.g., in a direction transverse to the axial direction. For example, as shown in FIG. 1, the tool 80 is supported on an arm 82. A cutting edge 81 of the tool 80 is urged against the profile 112 of the radial portions 110 of the member 100 as the member 100 is rotated about its axis. The tool 80 successively contacts the radial portions 110 of the member 100, thereby removing material from the radial portions 110 until the radial portions 110 are formed to predetermined dimensions. The arm 82 can be adjusted to move the tool 80 in the axial and radial directions. In particular, the arm 82 can be secured to a tool holder 86 that is engaged by a conventional machining device such as a turret 88 of a computer numeric control (CNC) machine. The holder 86 can define a base portion 87 that is structured to be received by the turret 88. Further, a support portion 89 of the holder 86 can be structured to support the arm 82 at a predetermined angle relative to the rotatable member 100. For example, the support portion 89 can be angled relative to the base portion 87 by about 15° so that the tool 80 can be positioned proximate to the rotatable member 100 for forming, without the tool or arm otherwise contacting the fixture 10 or the rotatable member 100. The machining device can adjust the position of the turret 88 and, hence, the holder 86, arm 82, and tool 80, to select positions for forming the rotatable member 100. Thus, as shown in FIG. 1, the entire outside profile 112 of the radial portions 110 can be accessed by the tool 80, without the tool 80 otherwise contacting the flanges 24 or other portions of the fixture 100.

Many modifications and other embodiments of the invention set forth herein will come to mind to one skilled in the art to which this invention pertains having the benefit of the teachings presented in the foregoing descriptions and the associated drawings. For example, it is appreciated that each of the components of the present invention can be formed of any conventional structural materials including, for example, steels and other metals. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fixture for supporting a rotatable member having a plurality of radial portions during manufacture of the rotatable member, the fixture comprising:

a collet extending in an axial direction and defining an aperture for partially receiving the rotatable member;

a locator device having a base and a plurality of flanges, the base configured to be connected to the collet, the flanges extending from the base in an axial direction and arranged circumferentially to define an aperture for at least partially receiving the rotatable member in the axial direction, the flanges defining slots therebetween for receiving radial portions of the rotatable member such that the radial portions extend radially outward from the flanges; and a tool holder configured to support a tool against the radial portions of the rotatable member extending between the flanges of the locator device and thereby form the rotatable member to predetermined dimensions.

2. A fixture according to claim 1 wherein the flanges and slots of the locator device extend helically in the axial direction and correspond to the configuration of the radial portions of the rotary member.

3. A fixture according to claim 1 wherein the flanges flare radially outward by at least about 90 degrees to define a circumferential surface directed in the axial direction for contacting a face of the rotatable member.

4. A fixture according to claim 1 wherein the flanges define a lip to radially support the rotary device.

5. A fixture according to claim 1 further comprising a rotatable spindle and an adapter plate extending circumferentially around the collet and configured to rotate with the collet, the adapter plate defining connection features for engaging the rotatable spindle and the locator device, thereby securing the locator device to the rotatable spindle.

6. A fixture according to claim 1 wherein the aperture of the locator device extends axially therethrough and the collet defines an aperture for receiving the rotary member.

7. A fixture according to claim 1 further comprising an arm secured to the holder and supporting the tool, wherein the holder and the arm are structured to support the tool in a predetermined configuration.

8. A locator device configured to support a rotatable member having a plurality of radial portions during manufacture of the rotatable member, the locator device comprising:
   a base; and
   a plurality of flanges extending from the base in an axial direction and arranged circumferentially to define an aperture for at least partially receiving the rotatable member in the axial direction,
   wherein the flanges define slots therebetween for receiving radial portions of the rotatable member such that the radial portions extend radially outward from the flanges.

9. A locator device according to claim 8 wherein the flanges and slots of the locator device extend helically in the axial direction and correspond to the configuration of the radial portions of the rotary member.

10. A locator device according to claim 8 wherein the flanges flare radially outward by at least about 90 degrees to define a circumferential surface directed in the axial direction for contacting a face of the rotatable member.

11. A locator device according to claim 8 wherein the flanges define a lip to radially support the rotary device.

12. A method of manufacturing a rotatable member having a plurality of radially outwardly projecting blades, the method comprising:
   providing a fixture defining a base and a plurality of flanges, the flanges extending from the base in an axial direction and spaced about a circumference of the fixture to define a central aperture surrounded by the flanges, and slots between adjacent flanges;
   supporting the rotatable member with the fixture such that a portion of the member is received in the aperture and the blades extend radially outward from the flanges through the slots defined between the flanges; and
   using a tool to form the blades to predetermined dimensions.

13. A method according to claim 12 further comprising urging the tool against the blades and rotating the fixture and the rotatable member such that the blades are formed by the tool to the predetermined dimensions.

14. A method according to claim 12 further comprising supporting the tool with a movable turret and adjusting the position of the turret such that the tool forms the blades to the predetermined dimensions.

15. A method according to claim 12 wherein said step of using a tool comprises forming an entire outside profile of the blades while the rotatable member is supported by the fixture.

16. A method according to claim 12 wherein the rotatable member is a boreless compressor wheel.

* * * * *